July 19, 1955

D. D. NIKLASON 2,713,609

TELEVISION CAMERA SUPPORTING STRUCTURE

Filed March 3, 1954

INVENTOR
Don D. Niklason

BY Mason, Fenwick & Lawrence
ATTORNEYS

July 19, 1955

D. D. NIKLASON 2,713,609

TELEVISION CAMERA SUPPORTING STRUCTURE

Filed March 3, 1954

INVENTOR
Don D. Niklason

BY Mason, Fenwick & Lawrence
ATTORNEYS

July 19, 1955

D. D. NIKLASON 2,713,609

TELEVISION CAMERA SUPPORTING STRUCTURE

Filed March 3, 1954

INVENTOR

Don D. Niklason

BY Mason, Fenwick & Lawrence

ATTORNEYS

United States Patent Office 2,713,609
Patented July 19, 1955

2,713,609

TELEVISION CAMERA SUPPORTING STRUCTURE

Don D. Niklason, Washington, D. C.

Application March 3, 1954, Serial No. 413,848

2 Claims. (Cl. 178—6)

The present invention relates in general to lecture illustrating systems and accessories, and more particularly to systems to be used in connection with classroom lectures for producing enlarged images of printed or illustrative matter, demonstrations and the like on one or more standard television viewing screens.

Heretofore, it has been a common practice to use optical projectors in connection with classroom lectures to produce an enlarged image of transparent slides or flat subjects which may be viewed by the entire class. While these optical projectors normally require transparent slides, some projectors have been used which are of the opaque object projector type producing an image by reflected light from a flat subject plane. Each of these types of projectors, however, are subject to certain undesirable limitations. All of these projectors require that the subject being imaged by the projector be a flat surface, in order to insure the proper degree of focus of the projected image. This eliminates the possibility of projecting enlarged images of experiments, demonstrations and the like performed by the lecturer or of other three-dimensional subjects. Further, in order to obtain necessary light intensity for the image to be viewed by a large class, the classroom must be substantially blacked out during projection. Also, because of the construction of optical projectors, the lecturer who is stationed at the projector cannot place a pointer over the subject being imaged so that an image of the pointer will appear in the enlarged projected image.

An object of the present invention is the provision of a novel system for use with classroom lectures which will produce one or more enlarged images of printed or illustrated lecture material, experiments, demonstrations, and the like, at a plurality of locations about the classroom remote from the lecture desk and thereby enable such material located on the lecture desk to be viewed in detail by the students from remote locations.

Another object of the present invention is the provision of a novel system for producing one or a plurality of enlarged images of lecture material at strategic locations to be viewed by an entire class, which is capable of accurately producing images of either transparent or opaque material.

Another object of the present invention is the provision of a novel system for producing enlarged images of lecture material which can be viewed by an entire class, without requiring darkening of the classroom.

Another object of the present invention is the provision of a novel system for producing enlarged images to be viewed by a lecture class, which is capable of producing accurate images of three-dimensional subjects or of procedures performed by the lecturer such as experiments, demonstrations and the like.

Another object of the present invention is the provision of a system for producing enlarged images of printed material in connection with a lecture, which is capable of readily imaging unprepared subjects which are non-planar in character.

Another object of the present invention is the provision of a system for producing one or a plurality of enlarged images of printed or illustrated lecture material in connection with a lecture, including a camera unit adapted to be directly associated with the lecture desk or table, which is readily controllable by the lecturer to vary the size and location of the field of view of the camera relative to the desk.

Another object of the present invention is the provision of a novel system for producing enlarged images of lecture material at points remote from the lecture desk, including a television camera and supporting means therefor producing three-dimensional adjustment of the camera, which is characterized by simplicity of control of the subject field sensed from the lecture desk.

Other objects, advantages and capabilities of the present invention will become apparent from the following detailed description, taken in conjunction with the accompanying drawings illustrating only a preferred embodiment of the invention.

Figure 1:
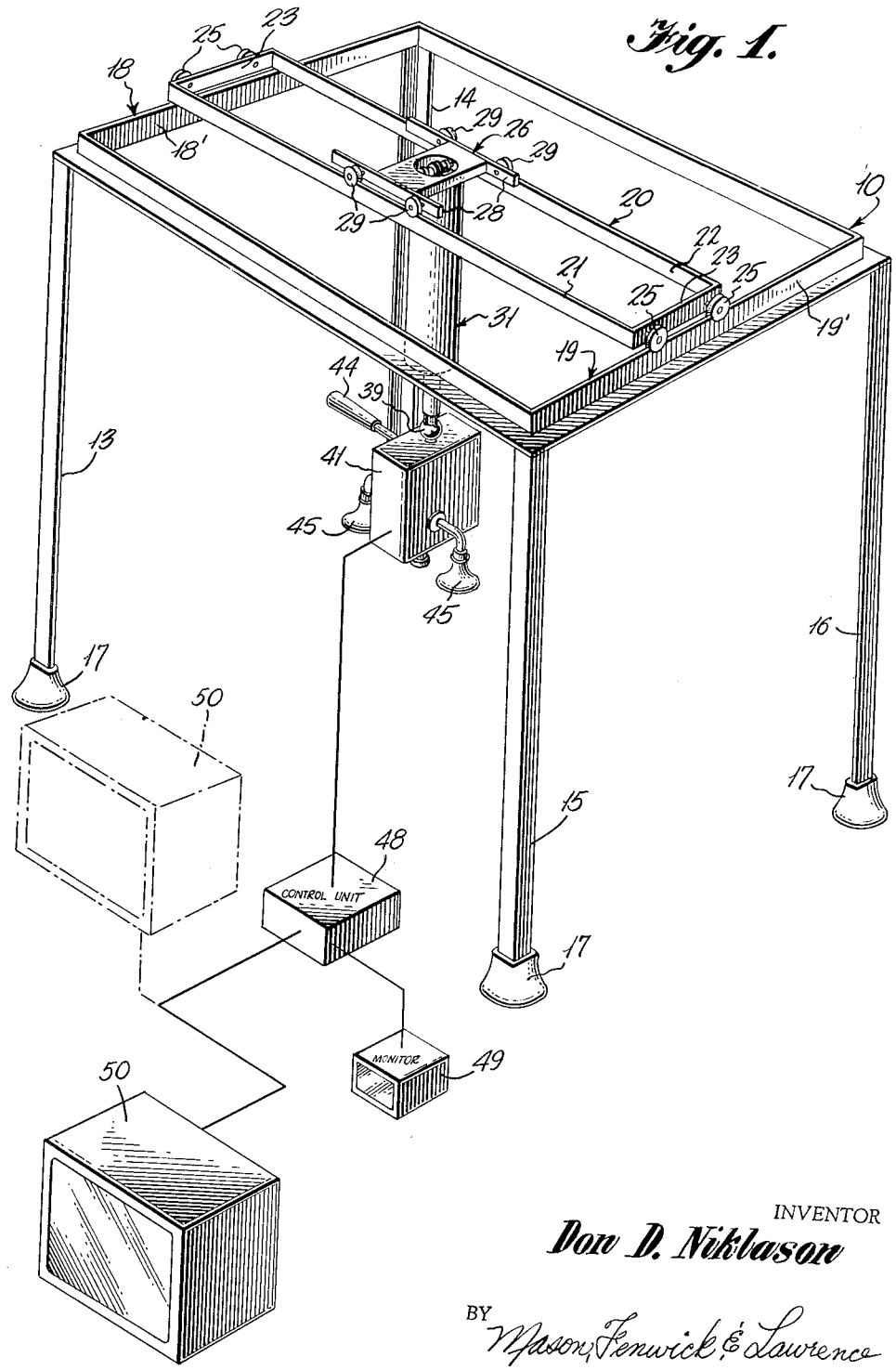
Figure 1 is a perspective view of a television camera and supporting means therefor embodying the present invention, together with a schematic illustration of electronic control and image-producing means associated therewith.
Figure 2:
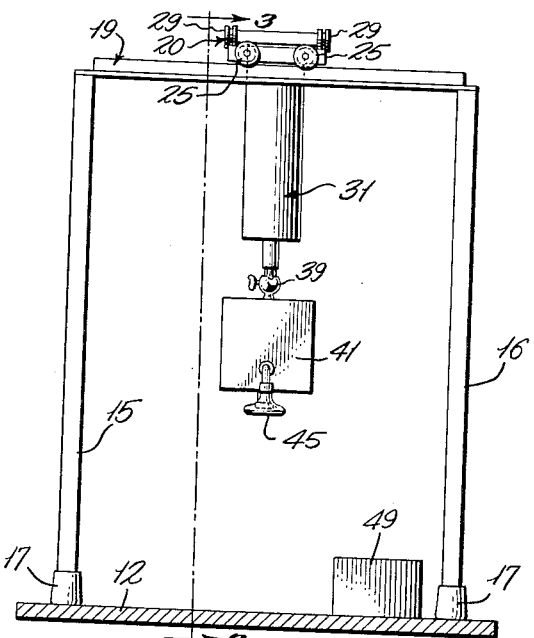
Figure 2 is an end elevation of the camera supporting structure.

The present invention comprises in general a standard television camera supported for three-dimensional movement on a camera supporting and scanning structure which is designed to fit onto a standard lecture desk and support the camera at an elevated position above the desk. The supporting structure is provided with an extensible camera carriage which permits adjustment of the vertical and angular position of the camera above the lecture desk and therefore the field of view of the camera, the carriage being supported for rectilinear movement on tracks or the like extending along longitudinal and transverse horizontal axes lying in a plane above and parallel to the desk. The camera carriage likewise supports a pair of flood lamps for illuminating the desk surface to be imaged by the camera lens.

The camera is electronically coupled in a conventional closed circuit television system with a suitable television camera control unit, through which the video signals are supplied to a monitor unit having a small screen designed to be supported on the lecture desk, and to one or a plurality of standard television receivers which are placed about the classroom at positions where the receiver screen can be viewed by the class.

Referring to the drawings, wherein like reference characters designate corresponding parts throughout the several figures, the camera supporting structure, which is indicated in general by the reference character 10, is designed to conveniently support a standard television camera, indicated by the reference character 11, above a conventional lecture desk 12. The camera is preferably of the small commercially available types, measuring approximately 3.75 by 5 inches by 10 inches in size and having a 1 inch f/1.5 color corrected lens with a conventional wide angle attachment, coated and color corrected, affording an effective wide angle focal length of 12.5 mm.

The camera supporting and scanning structure 10 comprises a series of vertical legs 13, 14, 15 and 16, preferably formed of angle iron members, having rubber suction fittings 17 at their lower ends to effectively retain the supporting and scanning structure 10 on the desk 12. Angle iron members 18 and 19 are fixed respectively to the tops of the legs 13, 14 and 15, 16, one flange of the angle irons 18 and 19 being disposed in a horizontal plane and the other flanges 18' and 19' extending upwardly in a vertical plane to form parallel tracks aligned with the transverse axis of the desk 12. Extending between the track flanges 18' and 19' is a travelling bridge indicated by the reference character 20 comprising a pair of track-forming angle iron members 21 and 22 extending longitudinally of the desk 12 and maintained in spaced parallel relation as a rigid unit by end angle iron members 23. Journalled on shafts 24 projecting from the erect vertical flanges of the end angle iron members 23 are wheels 25 having grooved peripheries to seat on the tracks 18' and 19'. A carriage or trolley 26 is supported for movement along the longitudinal tracks 21 and 22 and comprises a frame 27 having longitudinal members 28 on which wheels 29 having grooved peripheries are journalled to seat on the longitudinal tracks 21 and 22, and a rectangular centrally-apertured block 30 supported between the longitudinal members 28.

Figure 3:
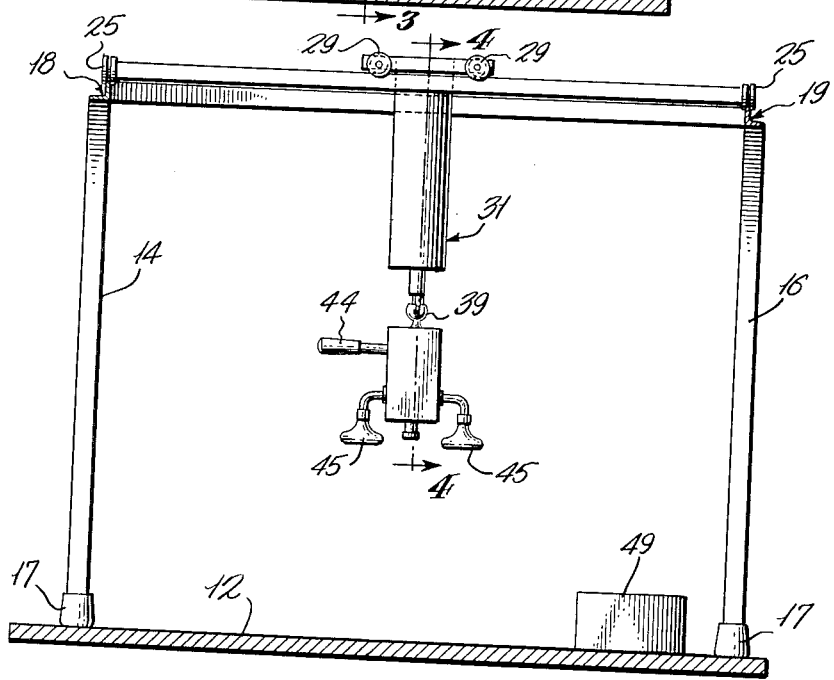
Figure 3 is a vertical longitudinal section view of the camera supporting apparatus, embodying the present invention, taken along the lines 3—3 of Figure 1.
Figure 4:
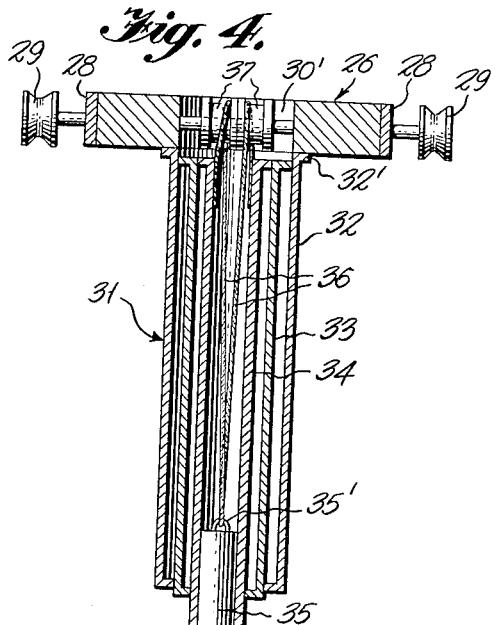
Figure 4 is a vertical transverse section view of the camera supporting structure taken along the lines 4—4 of Figure 1.

A counterbalanced telescoping tubular support 31 depends from the carriage 26 to support the camera 11, which permits vertical adjustment of the camera relative to the area to be imaged as well as angular adjustment of the optical axis of the camera relative to its vertical axis through the camera support. To this end, three coaxially disposed tubular sections 32, 33 and 34 are disposed one within the other to form the supporting arm for the camera 11, the upper end of the outermost tubular section 32 being provided with a peripheral flange 32' secured to the rectangular block 30 of the carriage 26. As illustrated in detail in Figures 3 and 4, the lower end of each of the tubular sections 32 and 33 are provided with inwardly projecting annular flanges disposed to engage outwardly projecting annular flanges at the upper ends of tubular sections 33 and 34 to limit downward travel of the sections 33 and 34.

Suitable counterbalancing means are provided in the telescoping arm 31 and carriage 26 which may for example comprise a weight 35 supported for vertical sliding movement within the innermost tubular section 34 having a cord 36 extending through a loop 35' on the upper end of the weight 35, the ends of the cord 36 extending over pulleys 37 and connected to the upper end of the innermost tubular section 34. The pulleys 37 in the preferred embodiment are disposed within the central aperture 30' in the block 30 and are journalled for rotation about a horizontal axis on a suitable shaft extending diametrically across the aperture 30'. The lower end of the innermost telescoping tubular section 34 is provided with a spherical head 38 about which extends a spherically hollow bearing 39 having a set screw 40 threaded therein and slots 39' extending inwardly from its upper edge in quadrate relation to receive the shank of the head 38, the bearing 39 and spherical head 38 forming a universal joint for supporting a camera housing 41 in angularly adjustable depending relation from the innermost telescoping tubular section 34. In the preferred embodiment, the head 39 is provided with an annular flange plate 42 at its lower end to be secured by screws against the back wall of the camera housing 41.

The camera housing 41 is in the form of a downwardly opening box of a size to snugly accommodate the standard television camera 11, the lower end of the housing 41 being provided with a removable retaining plate 43 secured to the body of the housing 41 by screws or the like, the retaining plate 43 having a central opening through which the lens of the camera projects. Mounted on one side of the camera housing 41 adjacent the upper end thereof is a suitable handle 44 projecting at right angles to the side wall of the camera housing 41 by which the camera supported in the camera housing 41 can be conveniently adjusted to the desired position vertically, longitudinally and transversely within the supporting and scanning structure 10. Likewise, supported on opposite side walls of the camera housing 41 are a pair of flood lamps 45 facing downwardly toward the lecture desk 12 and supported in standard sockets 46 fixed on the ends of arms 47 secured to the camera housing 41.

Figure 5:
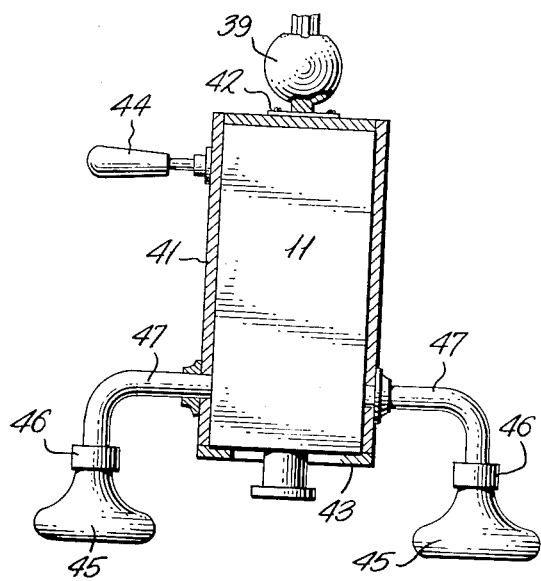
Figure 5 is a detail section view illustrating the construction of the camera housing unit, taken along the lines 5—5 of Figure 4.

As is illustrated in the block diagram of Figure 5, the camera 11 is coupled by means of a flexible cable to a television system camera control unit 48 of conventional form. As is generally understood in the trade, these control units can accommodate three viewers from the output of a single television camera without the use of booster sections. In the preferred embodiment illustrated herein, one output from the camera control unit 48 is coupled to a television monitor unit 49, preferably having a 7-inch screen and mounted in a compact unit which can be located on the lecture desk to be viewed by the lecturer. Another output from the monitor unit is coupled to a standard television receiver 50 having a 20-inch screen, the receiver 50 being preferably positioned at a point in the classroom remote from the lecture desk so that it can be viewed by all the members of the class. For large classes, it may be desirable to provide a plurality of such 20-inch television receivers, all of which will be fed from the output of the control unit 48.

While the above description has been directed to standard television cameras, control units and receivers, it is apparent that since the proposed system is a closed television system in which no carrier signal is required, closed circuit television components especially designed for that type of system in which all of the radio frequency components are eliminated may be used if desired.

Assuming that the dimensions of the lecture desk area are approximately 3 by 5 feet, supporting and scanning structure 10 described above would be dimensioned to a height slightly in excess of 5 feet and to longitudinal, transverse and horizontal dimensions yielding a scanning distance of 4 feet longitudinally and 2 feet transversely. The telescopically extensible supporting arm 31 for the camera 11 should be dimensioned to produce vertical camera movement of approximately 2 feet, with the minimum camera distance to the lecture desk of 2 feet and the maximum camera distance of 4 feet. With these dimensions, the maximum area of coverage of the camera would be of the order of 2.8 feet with the camera in top position, and the minimum area of coverage with the camera in lowest position would be approximately 1.4 feet.

With the above described system, the lecturer can not only produce enlarged images of flat subjects, such as may be usually handled in a reflection-type optical projector, but can also produce on the television receiver screen enlarged reproductions of experiments or demonstrations performed by the lecturer on the lecture desk from a wide variety of viewing angles by vertical adjustment of the extensible arm 31 and angular adjustment of the universal joint 38, 39, enabling them to be easily viewed by the entire class. Further enlarged images can be produced on a television screen of books or portions of books, laboratory notebook drawings, microscope slides, or any other objects which the lecturer desires the class to observe as a unit, even though the subjects to be imaged are not especially prepared to be imaged by an optical projector. Further, it is not necessary to darken the classroom to permit the demonstrations or other lecture material to be imaged on the television screen and viewed by the class, as would be the case if an optical projector were being used.

The above described system, therefore, has marked advantages over the conventional optical projectors, as a classroom accessory and facilitates the close participation of the entire class in the lecture and accompanying demonstrations and the like, even where performed in very large classrooms.

While but one particular embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

I claim:

1. Apparatus for use with a closed circuit educational demonstration television system including a television camera, comprising a supporting frame for supporting said camera above a lecture demonstration surface including framing means defining a pair of parallel tracks extending along one axis of the lecture demonstration surface and disposed above and parallel thereto, a second pair of tracks extending at right angles to said first pair of tracks and supported on said first mentioned tracks for movement along the same, and a carriage having wheels rotatably and guidably supported on said second mentioned tracks, a telescopically extensible arm supported on said carriage in depending relation, joint means adapted to support said camera on the end of said telescopically extensible arm for movement from a downwardly directed position to a substantially horizontally directed position, light means supported in fixed relation to said camera supporting joint means, and counterbalancing means associated with said telescopically extensible arm for counterbalancing the weight of said camera.

2. Apparatus for use with a closed circuit educational demonstration television system including a television camera, comprising a rectangular frame for supporting said camera above a lecture demonstration surface comprising a pair of parallel angle irons located in a horizontal plane and disposed at opposite ends of said frame with one flange of each of said angle irons extending vertically, legs supporting said angle irons above said demonstration surface and having suction fittings on the lower ends of said legs for securing the same to said surface, a bridge assembly extending between said pair of angle irons at right angles thereto comprising a pair of parallel angle iron members having one flange of each in parallel vertical planes and pulley wheels disposed at the ends of said second mentioned angle iron members journalled on axles extending parallel to the longitudinal axis of said bridge for movement along said vertical flanges of said first mentioned angle irons, and a carriage having pulley wheels journalled thereon for movement along said vertical flanges of said second mentioned angle iron members, a telescopically extensible arm supported on said carriage in depending relation, a housing member conforming substantially to the configuration of the camera to be employed with said apparatus for enclosing said camera and supporting the same therein, joint means supporting said camera housing on the end of said telescopically extensible arm for movement from a downwardly directed position to a substantially horizontally directed position, light means supported on opposite sides of said camera housing, and counterbalancing means associated with said telescopically extensible arm for counterbalancing the weight of said camera.

References Cited in the file of this patent

UNITED STATES PATENTS 2,538,910   Miller _____ Jan. 23, 1951

OTHER REFERENCES

Television News, March-April 1932, page 26.